US012336646B2

(12) United States Patent
Ingram

(10) Patent No.: US 12,336,646 B2
(45) Date of Patent: Jun. 24, 2025

(54) MODULAR WALL PANEL SYSTEM

(71) Applicant: Process Displays LLC, Minneapolis, MN (US)

(72) Inventor: Scott Ingram, Minneapolis, MN (US)

( * ) Notice: Subject to any disclaimer, the term of this patent is extended or adjusted under 35 U.S.C. 154(b) by 298 days.

(21) Appl. No.: 17/838,746

(22) Filed: Jun. 13, 2022

(65) Prior Publication Data

US 2023/0110104 A1 Apr. 13, 2023

Related U.S. Application Data

(60) Provisional application No. 63/209,649, filed on Jun. 11, 2021.

(51) Int. Cl.

*A47F 5/08* (2006.01)
*A47B 96/14* (2006.01)
*A47F 5/10* (2006.01)
*E06B 9/06* (2006.01)

(52) U.S. Cl.

CPC ........ *A47F 5/0815* (2013.01); *A47B 96/1416* (2013.01); *A47F 5/0846* (2013.01); *A47F 5/105* (2013.01); *E06B 9/0638* (2013.01)

(58) Field of Classification Search

CPC ...... A47F 5/0815; A47F 5/0846; A47F 5/105; A47F 5/083; A47B 96/1416; E06B 9/0638

USPC .................................... 52/36.1, 36.5, 506.01

See application file for complete search history.

(56) References Cited

U.S. PATENT DOCUMENTS

| | | | | | |
|---|---|---|---|---|---|
| 421,540 | A * | 2/1890 | Barber | A47F 5/116 | 211/132.1 |
| 3,570,679 | A * | 3/1971 | Edson | A47F 7/163 | 108/1 |
| 4,022,328 | A * | 5/1977 | Toland | A47F 7/163 | 108/32 |
| 4,768,660 | A * | 9/1988 | Handler | B25H 3/04 | 248/222.12 |
| 4,934,645 | A * | 6/1990 | Breslow | A47B 96/07 | 248/242 |
| 5,172,529 | A * | 12/1992 | Van De Riet | A47B 21/06 | 108/134 |
| 5,738,019 | A * | 4/1998 | Parker | A47B 57/16 | 211/175 |
| 5,775,034 | A * | 7/1998 | Logue | A47B 21/06 | 108/37 |
| 7,954,655 | B2 * | 6/2011 | Virvo | A47F 5/10 | 211/150 |
| 8,333,158 | B2 * | 12/2012 | Wise | A47B 57/20 | 108/134 |
| 9,770,103 | B2 * | 9/2017 | Cochran | A47B 46/00 | |
| 10,568,423 | B1 * | 2/2020 | McDowell | A47B 96/1408 | |
| 2007/0000854 | A1 * | 1/2007 | Virvo | A47F 5/10 | 211/72 |
| 2012/0037583 | A1 * | 2/2012 | Wise | A47B 57/20 | 211/150 |

(Continued)

*Primary Examiner* — Rodney Mintz

(74) *Attorney, Agent, or Firm* — Daniel A. Rosenberg; Taft Stettinius & Hollister LLP

(57) ABSTRACT

A panel system for use with display material. The panel system comprised of a frame having multiple slats mounted thereto. The slats pivoting to allow access behind the panel, having multiple holes to route cables and wires, and having slots for brackets to which display material can be attached. The panels are mountable to a wall, or other surface, and modular.

12 Claims, 16 Drawing Sheets

(56) References Cited

U.S. PATENT DOCUMENTS

| | | | | |
|---|---|---|---|---|
| 2014/0263128 | A1* | 9/2014 | Garrett | A47F 5/0815 211/144 |
| 2014/0263919 | A1* | 9/2014 | Duffy | A47F 5/0807 248/158 |
| 2017/0156494 | A1* | 6/2017 | Cochran | A47B 96/024 |
| 2017/0254071 | A1* | 9/2017 | Leaverton | E04B 2/7425 |
| 2021/0278036 | A1* | 9/2021 | Anderson | A47B 87/007 |
| 2022/0000262 | A1* | 1/2022 | Anderson | A47B 96/028 |

* cited by examiner

MODULAR WALL PANEL SYSTEM

RELATED APPLICATIONS

The present application claims the benefit of, and incorporates by reference, U.S. Provisional Patent Application No. 63/209,649 filed Jun. 11, 2021.

BACKGROUND OF THE INVENTION

Field of the Invention

This invention relates to a modular wall panel. In particular, the invention relates to a wall panel configured to hold a variety of devices including electronic devices, and more particular devices used in display setting such as retail store environments.

The display of items, in particular in retail environments, in an efficient and clear manner is important to both customers and businesses. Typically, merchandise or display items are arranged on racks, gondolas, walls, or other surfaces. The items need to be easily removed, replaced, as the arrangement of the items and the displays change frequently. This can include changes for the placement of advertising, decorative backings, and even adjustments seasonally or for holidays, not to mention the merchandise constantly changes too. A great deal of time is often dedicated to maintaining the display of such items.

In the case of electronics, a further complication arises for displays that feature actual live use of such devices. This can include TVs, computer monitors, or other electronic devices. It is preferable to have the devices operating, which requires providing for power, connecting a plethora of cords, and the routing thereof. Prior art standard displays are not designed for such uses. As a result chords are haphazardly arranged, the devices are difficult to attach and secure, replacing the items takes a great deal of time and effort, and in many cases the devices are displayed but not connected to power.

Thus, a need exists for an improved system for handling such displays.

DETAILED DESCRIPTION OF THE PREFERRED EMBODIMENTS

In the Figures is shown a modular wall panel and system for mounting various devices. As shown in FIGS. 1 and 2, the panel 10 is comprised of a series of slats 12 on the front of the panel 10. In the embodiment shown in the Figures, the panel 10 has four slats 12. The slats 12 are secured to each other with vertical supports 26 located on the backside of the slats 12. A frame 14 supports the slats 12 from behind. The slats 12 further comprise a series of openings, and in particular, holes 16 that include smaller holes and larger tent shaped openings. The holes and tents 16 provide access from, and through, the front and back of the panel 10.

The frame 14 includes removable side panels 20 on each side that secure to side members 28, which form a vertical support for the frame 14. The frame 14 also includes braces 24 that connect to the side members 20. There are three braces 24 (top, bottom, and center). The braces 24 include holes 16, as do the side panels 20 and side members 28.

The side panels 20 include teeth 22, which are the point of attachment or the panels 10. Preferably, the panels 10 are configured to attach to retail gondola shelving of the kind shown in FIGS. 25-17. The gondolas include slots along the sides for securement of items like shelves as shown in FIG. 25. Several panels 10 can attach to the gondola as needed. The teeth 22 of the side panels 20 secure to the slots in the sides of the gondola in a similar manner. The panel 10 can also be attached from the back of the frame 12 via hooks 30 in the side members 28. The side panels 20 attach to the side members 28 with a wing nut 42. This allows for the side panels 20 to be easily removed and different panels attached that different securement means as needed based on the application.

The frame 14 includes a pivot connector 32 that secures to the top of each side member 28. The pivot connector 32 is comprised of a bearing 36, and a pin plate 38 that fits into the bearing 36. The slats 12 have a pin plate 38 that secures to the pivot connector 32. This allows the slats 12 to pivot about the top of the frame 14. A kickstand 40 is attached to the side members 28 with a bolt or screw, and the other end of the kickstand attaches to the slats 12. This allows the slats 12 to be raised and held in place for access to the back of the slats 12 without removing the panels 12.

The panels 12 are uniquely suited for use in a display environment, and can connect items in a highly versatile manner, including electronic devices, shelves, brackets, and advertising and promotional material. The holes 16 in the various members allow for wiring, power chords, and the like to pass from the front to back of the panels, and from panel to panel (either from side to side or from top to bottom). As the various frame 14 members also have holes. Also, the tent shaped holes 16 serve, not only as pass-through, but also to allow for attachment of larger brackets associated with TV or audio visual equipment, or display items as shown in the Figures (see FIG. 25-27). The smaller holes 16 can be used as conduits for wires, or as for attaching screws, nuts, bolts, wingnuts, and such to secure fixtures to the slats 12. The grooves between the slats 12 can also be used to secure items thereto. The holes 16 in the braces 24 can be used to secure headers and footers providing even further flexibility.

The kickstand 40 allows for raising all the slats, for access, without removing any attachments, as well as providing easy access to the back and front of the panels 10. Previously, the entire display needed to be removed, disassembled, or multiple people had to be stationed on either side of the display to make changes.

The panels preferably are made of a magnetic material to that, magnetic materials can be attached such as graphics, advertising, and promotional material. Alternatively, in some cases, a backing material can be attached to cover the unused holes 16. Also dimensional panels can be attached to slats for building displays (see FIG. 26).

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods, and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention. Those of ordinary skill in the art that have the disclosure before them will be able to make modifications and variations therein without departing from the scope of the invention.

Figure 2:
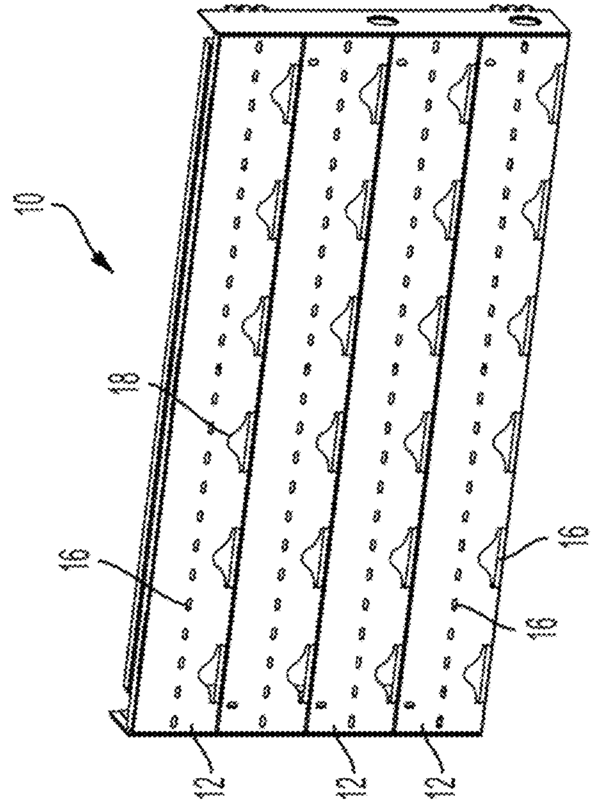
FIG. 2 is a front perspective view of the panel.
Figure 1:
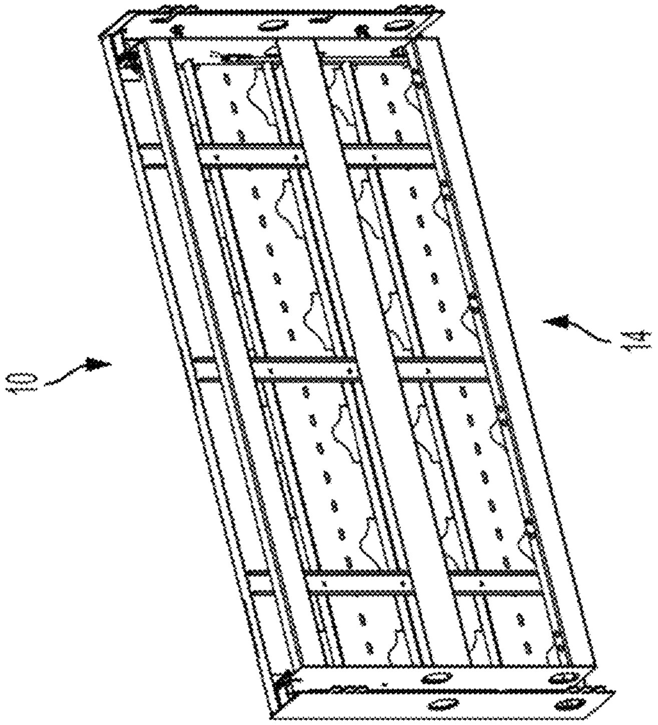
FIG. 1 is a back perspective view of a panel.
Figure 3:
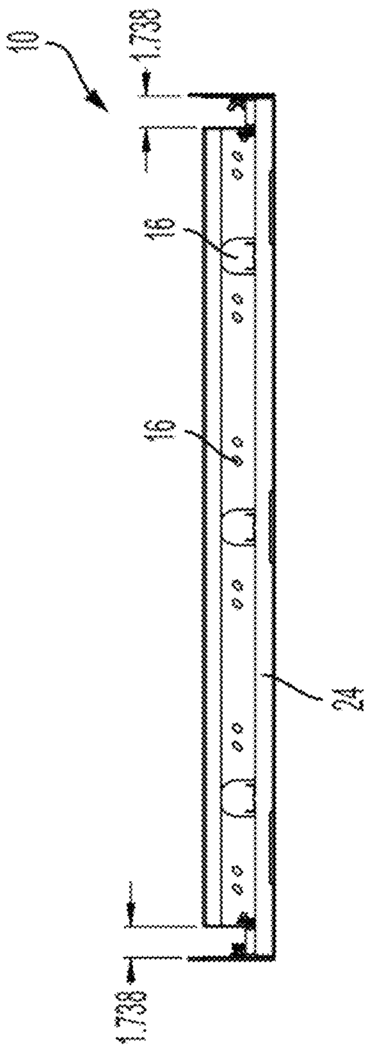
FIG. 3 is a top view of the panel.
Figure 4:
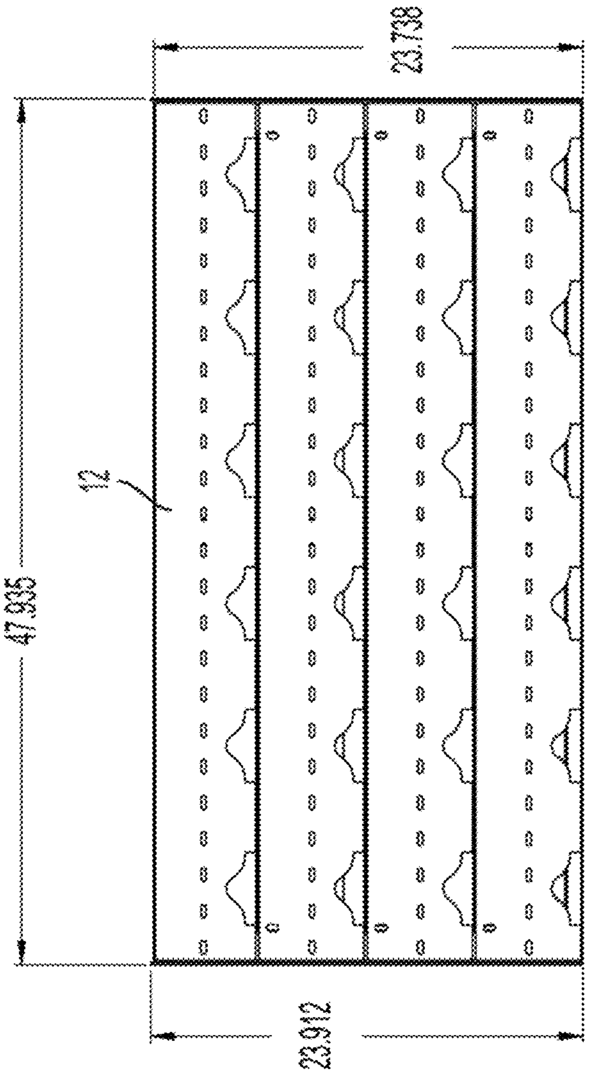
FIG. 4 is a front view of the panel.
Figure 6:
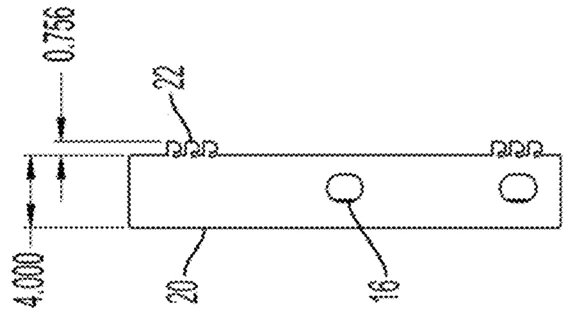
FIG. 6 is a side view of the panel.
Figure 5:
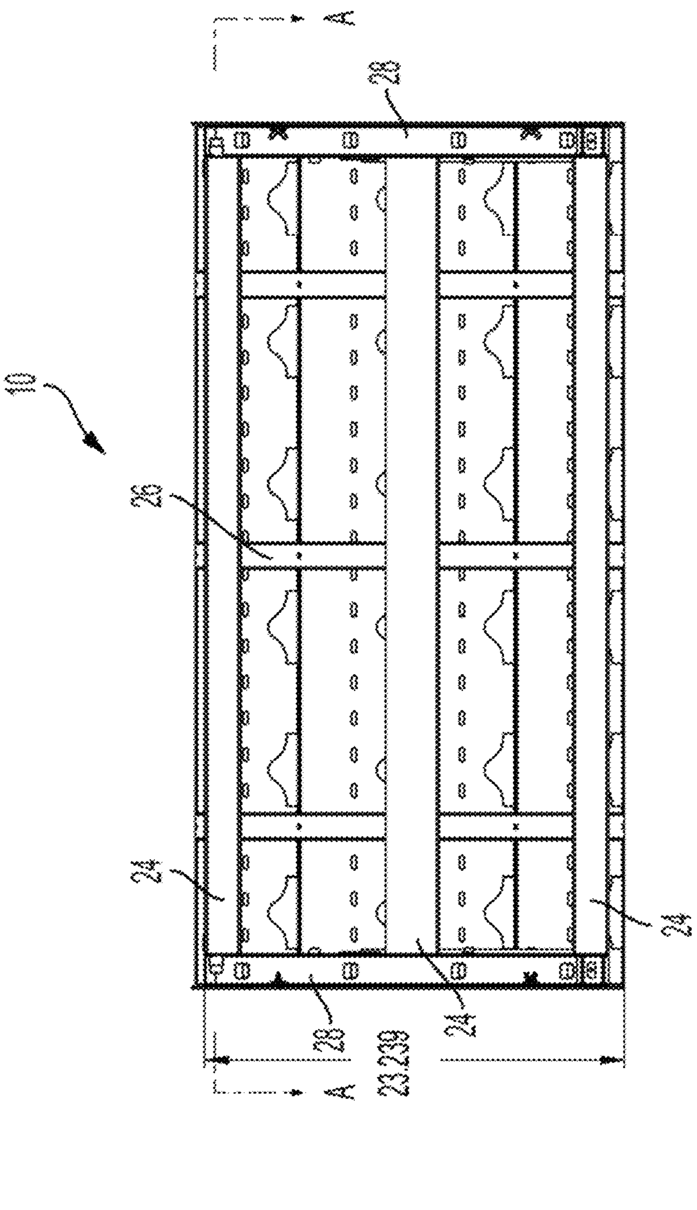
FIG. 5 is a rear view of the panel.
Figure 7:
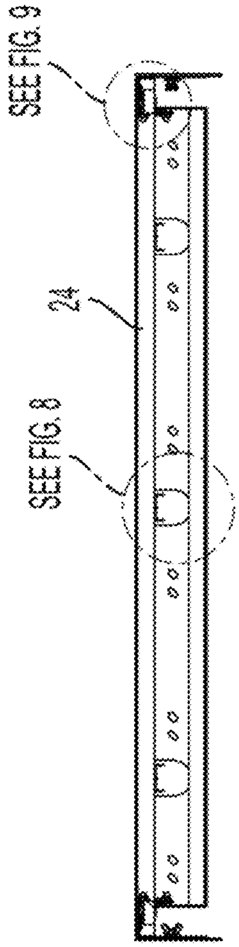
FIG. 7 is a side view of a brace of the panel.
Figure 8:
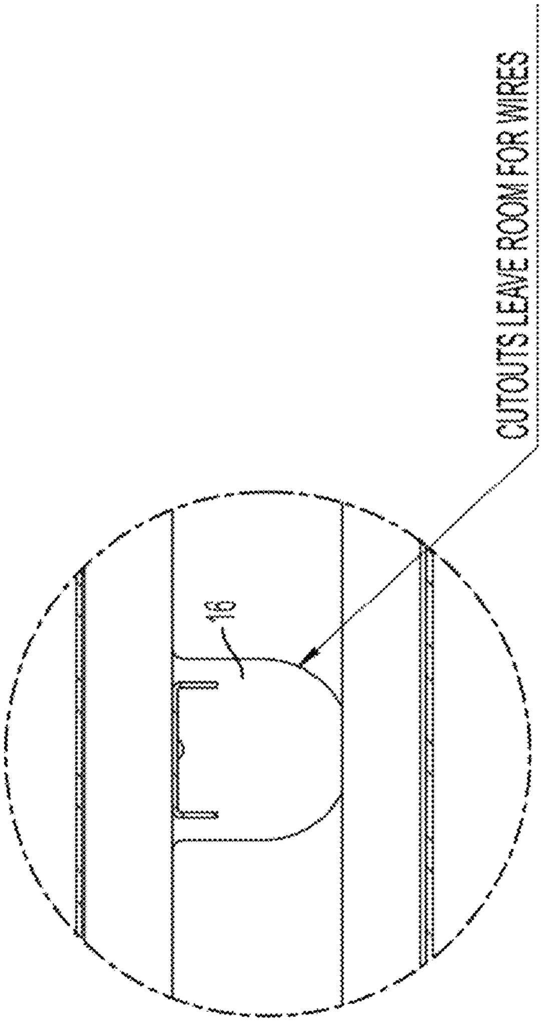
FIG. 8 is a view of the portion of the brace marked "Detail C" in FIG. 7.
Figure 9:
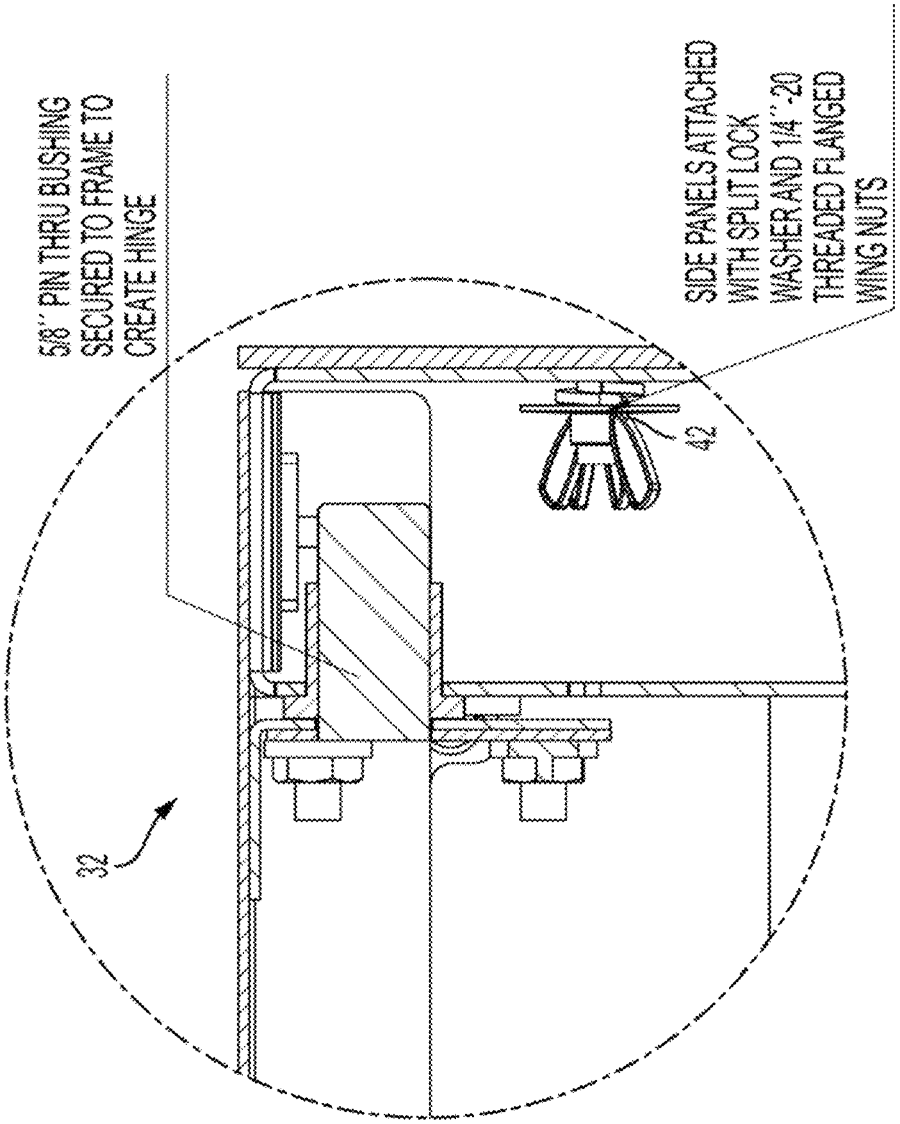
FIG. 9 is a view of the portion of the brace marked "Detail B" in FIG. 7.
Figure 10:
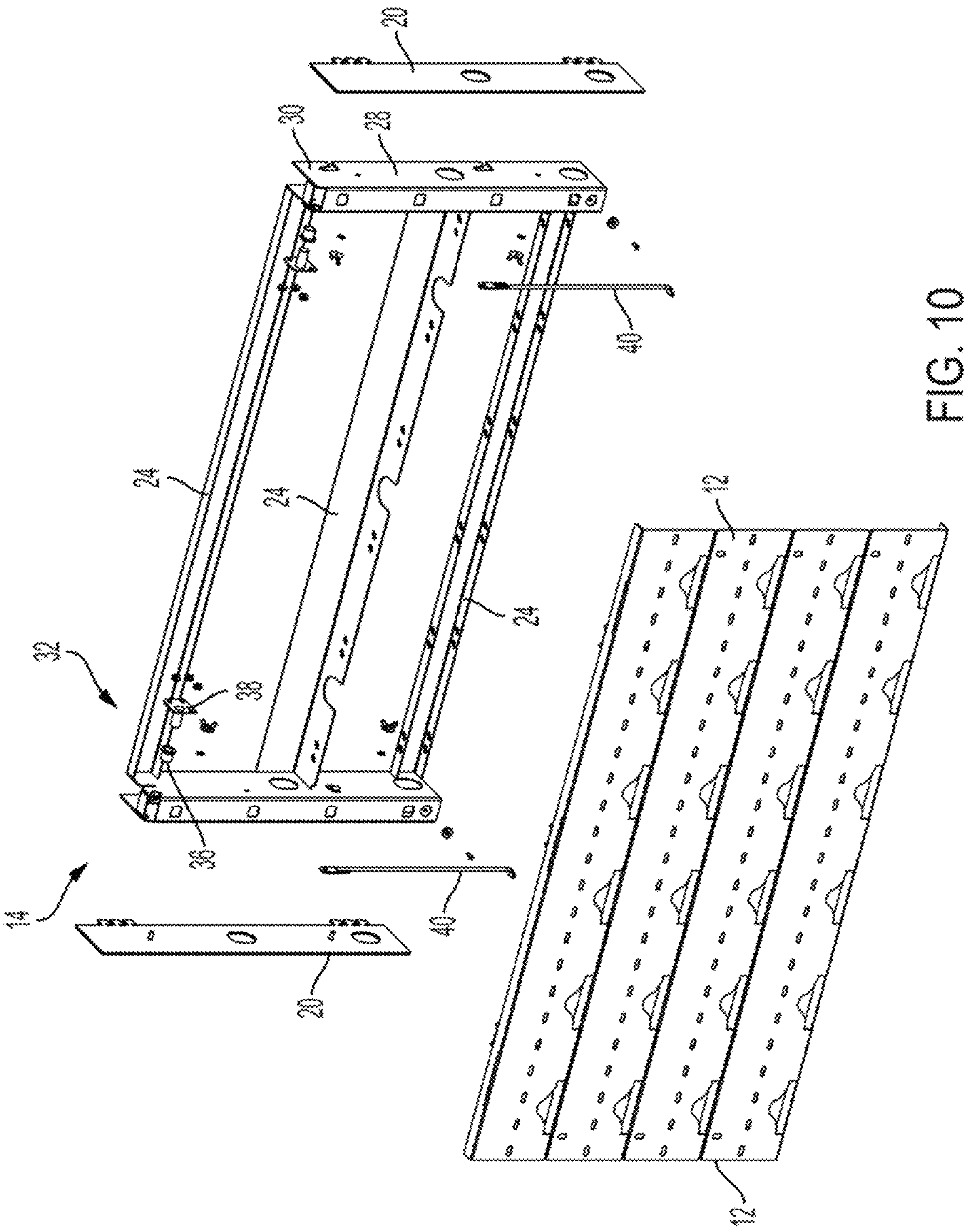
FIG. 10 is an exploded front perspective view of the panel.
Figure 12:
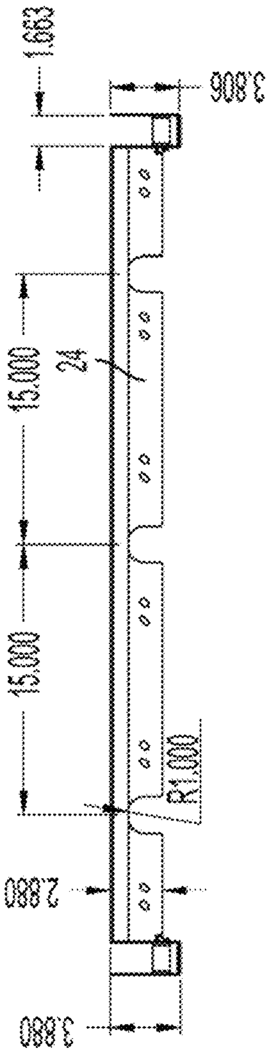
FIG. 12 is a top view of a brace of the panel.
Figure 13:
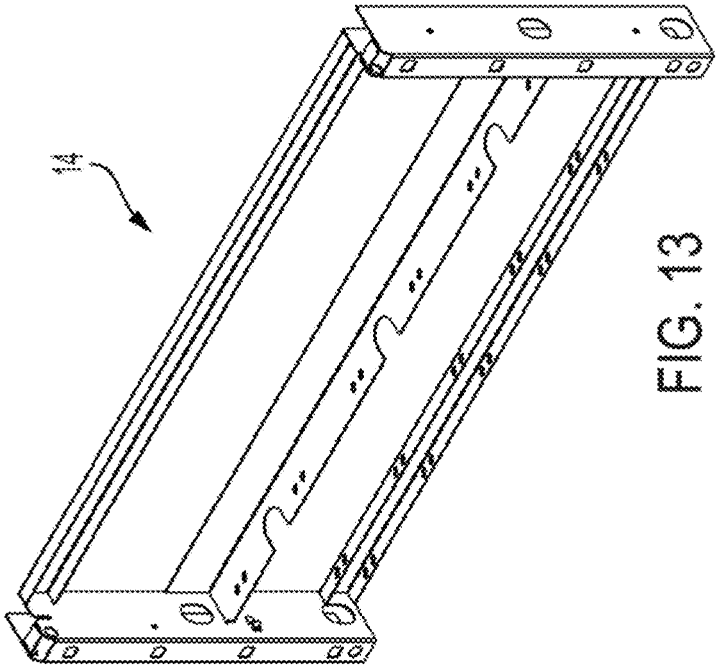
FIG. 13 is a back view of a frame of the panel.
Figure 11:
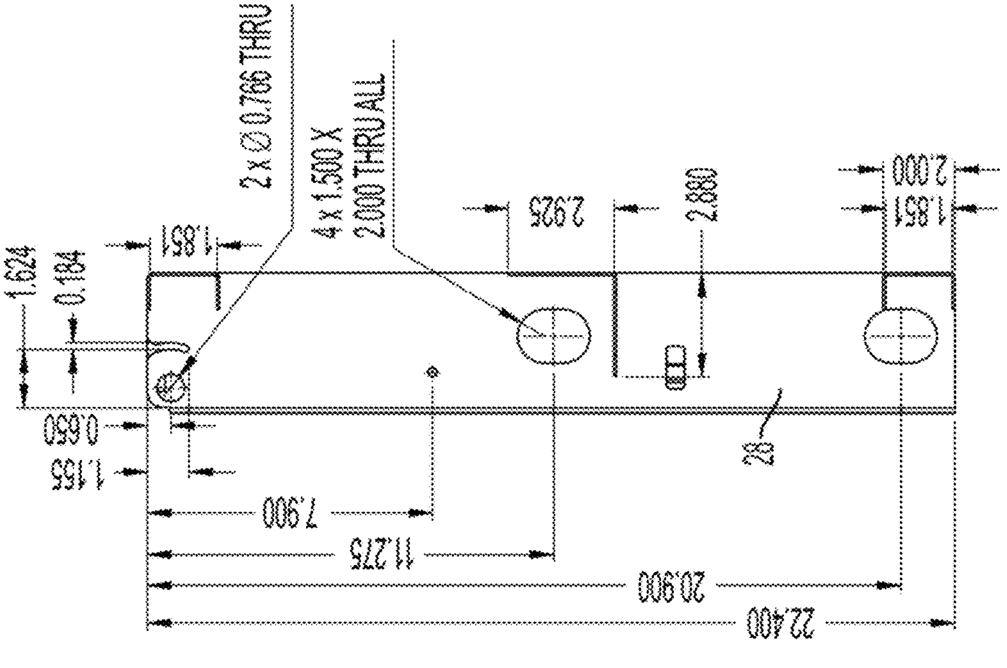
FIG. 11 is a side view of a side member of the panel.
Figure 15:
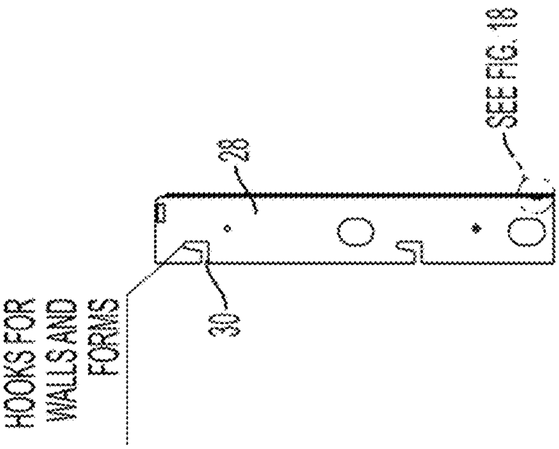
FIG. 15 is a side view of the side member of the panel.
Figure 14:
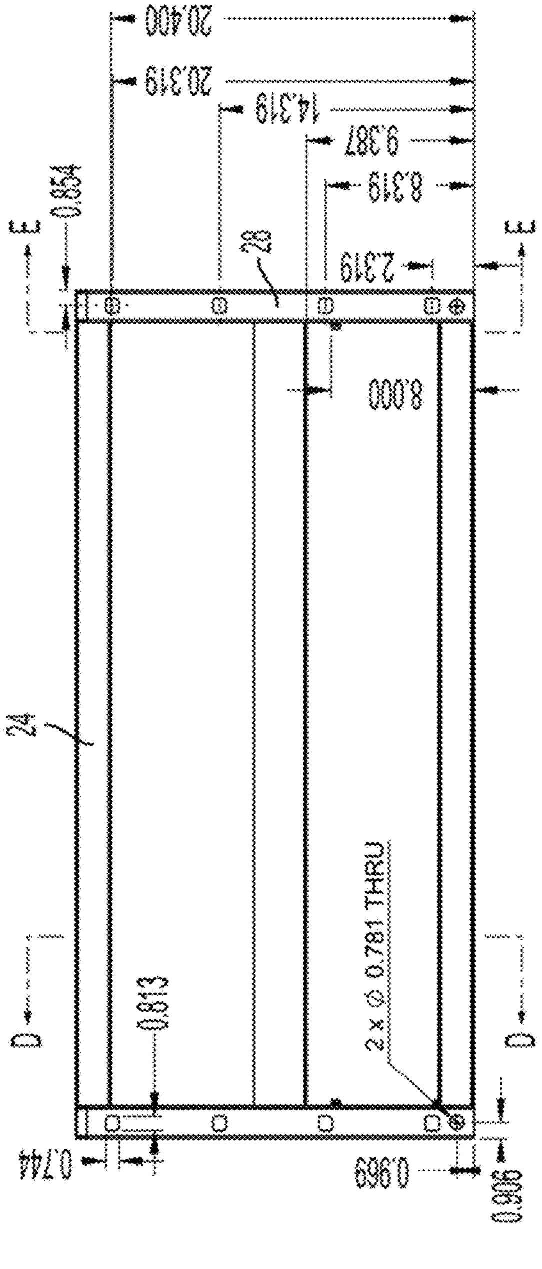
FIG. 14 is front view of the frame of the panel.
Figure 17:
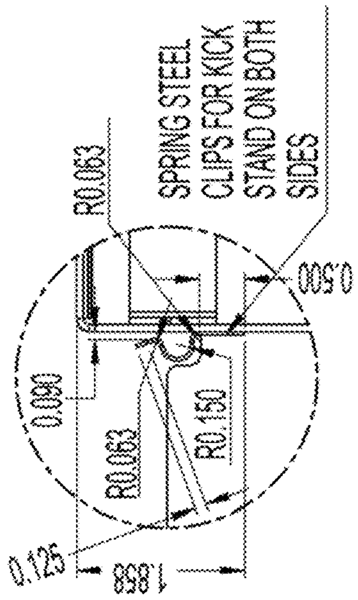
FIG. 17 is a view of the portion of the brace marked "Detail G" in FIG. 16.
Figure 16:
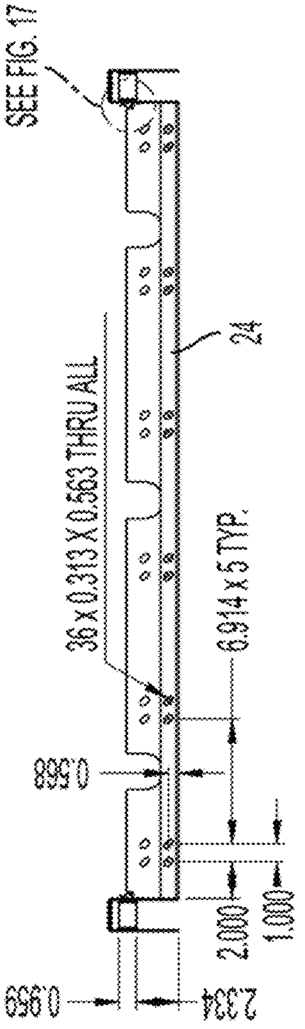
FIG. 16 is a bottom view of the brace of the panel.
Figure 18:
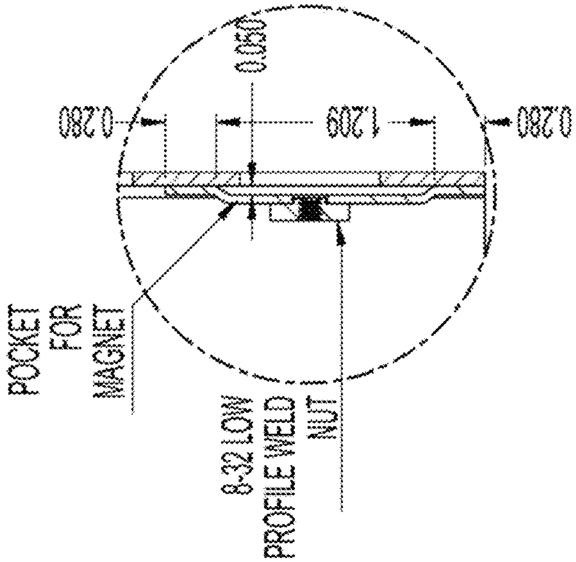
FIG. 18 is a view of the portion of the side member marked "Detail F" in FIG. 15.
Figure 19:
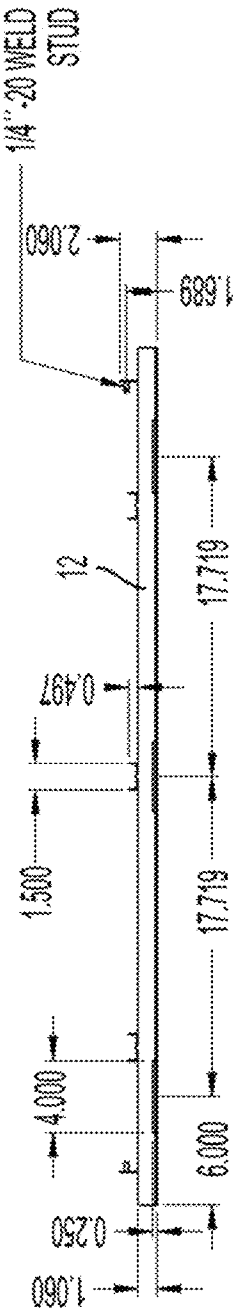
FIG. 19 is a top view of the slats.
Figure 20:
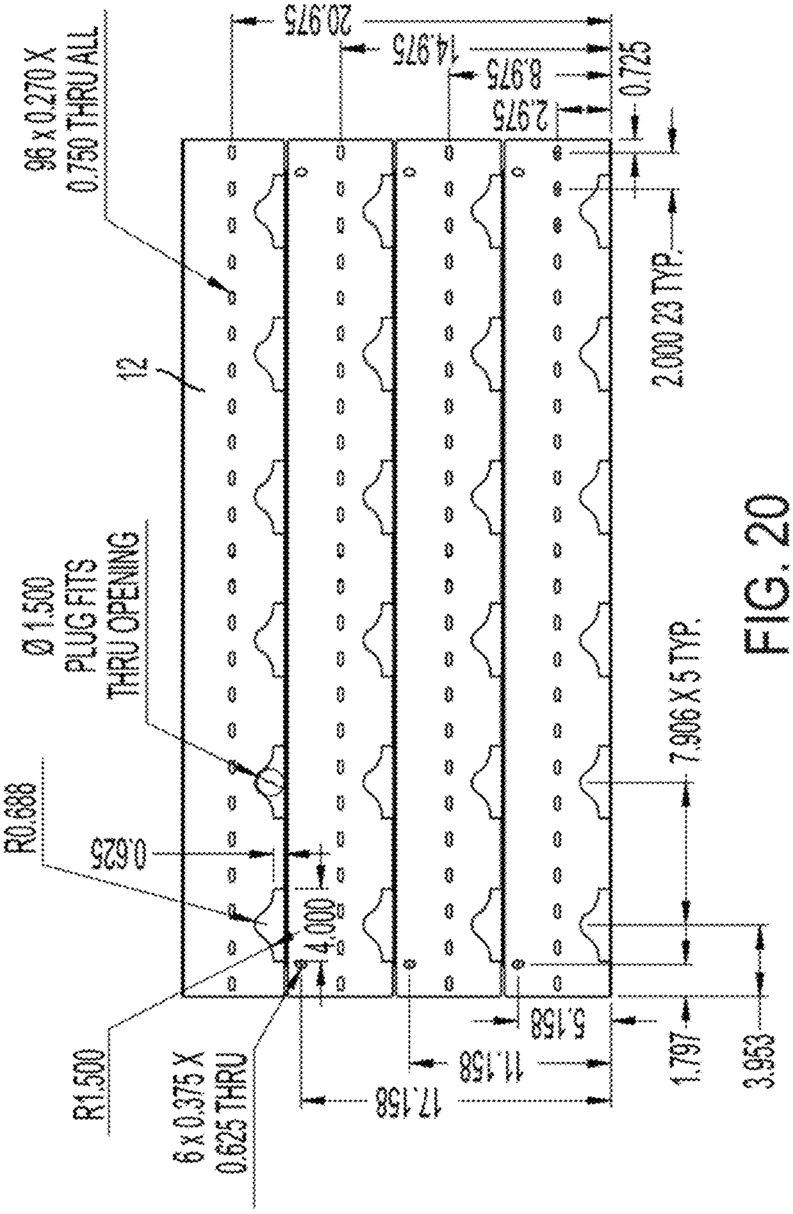
FIG. 20 is a front view of the slats.
Figure 21:
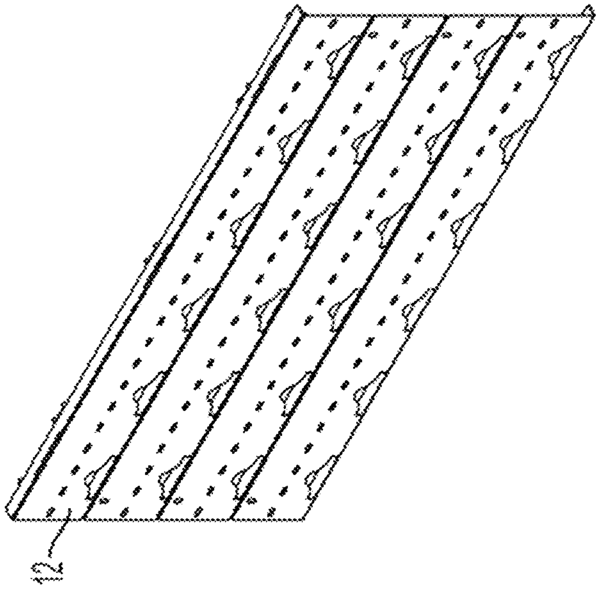
FIG. 21 is a perspective view of the slats.
Figure 23:
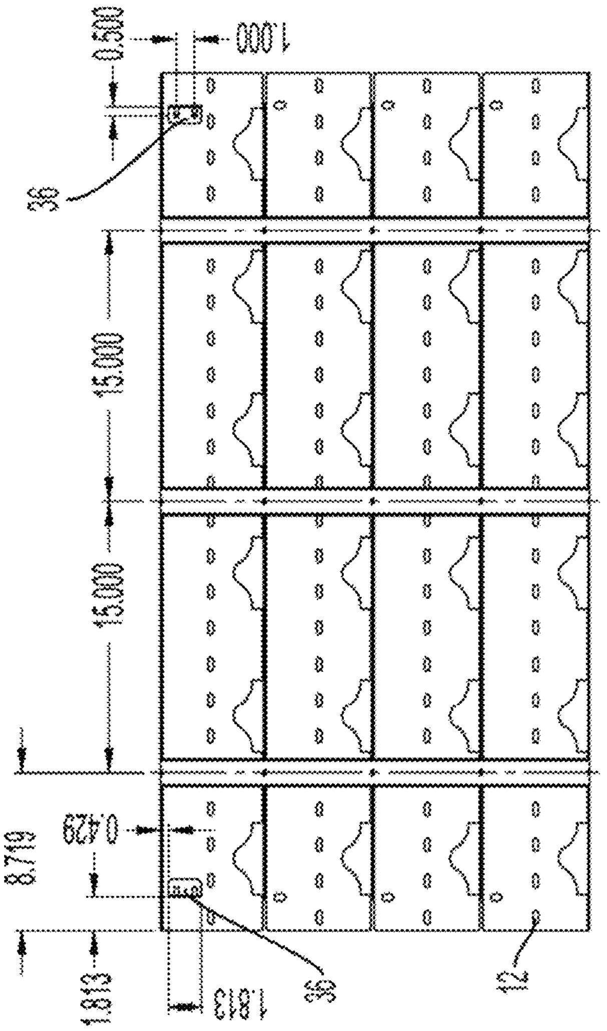
FIG. 23 is a back view of the slats.
Figure 22:
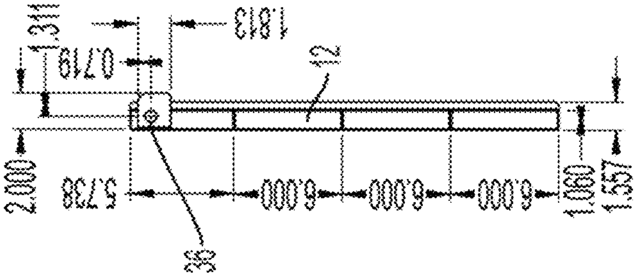
FIG. 22 is a side view of the slats.
Figure 24:
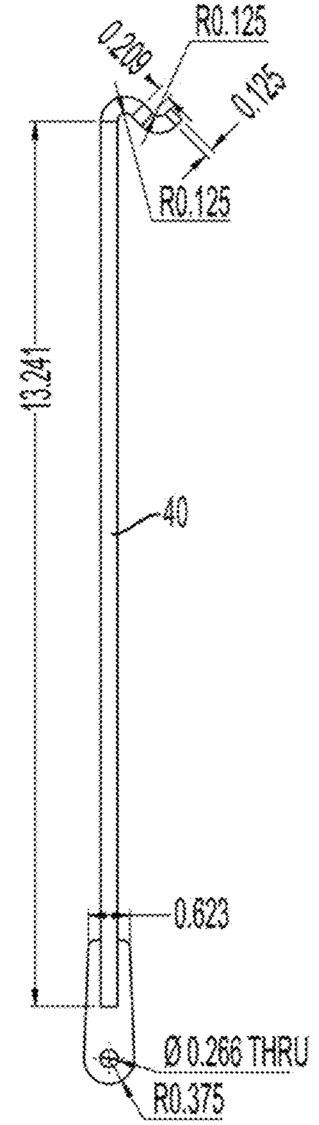
FIG. 24 shows multiple views of the kickstand.
Figure 25:
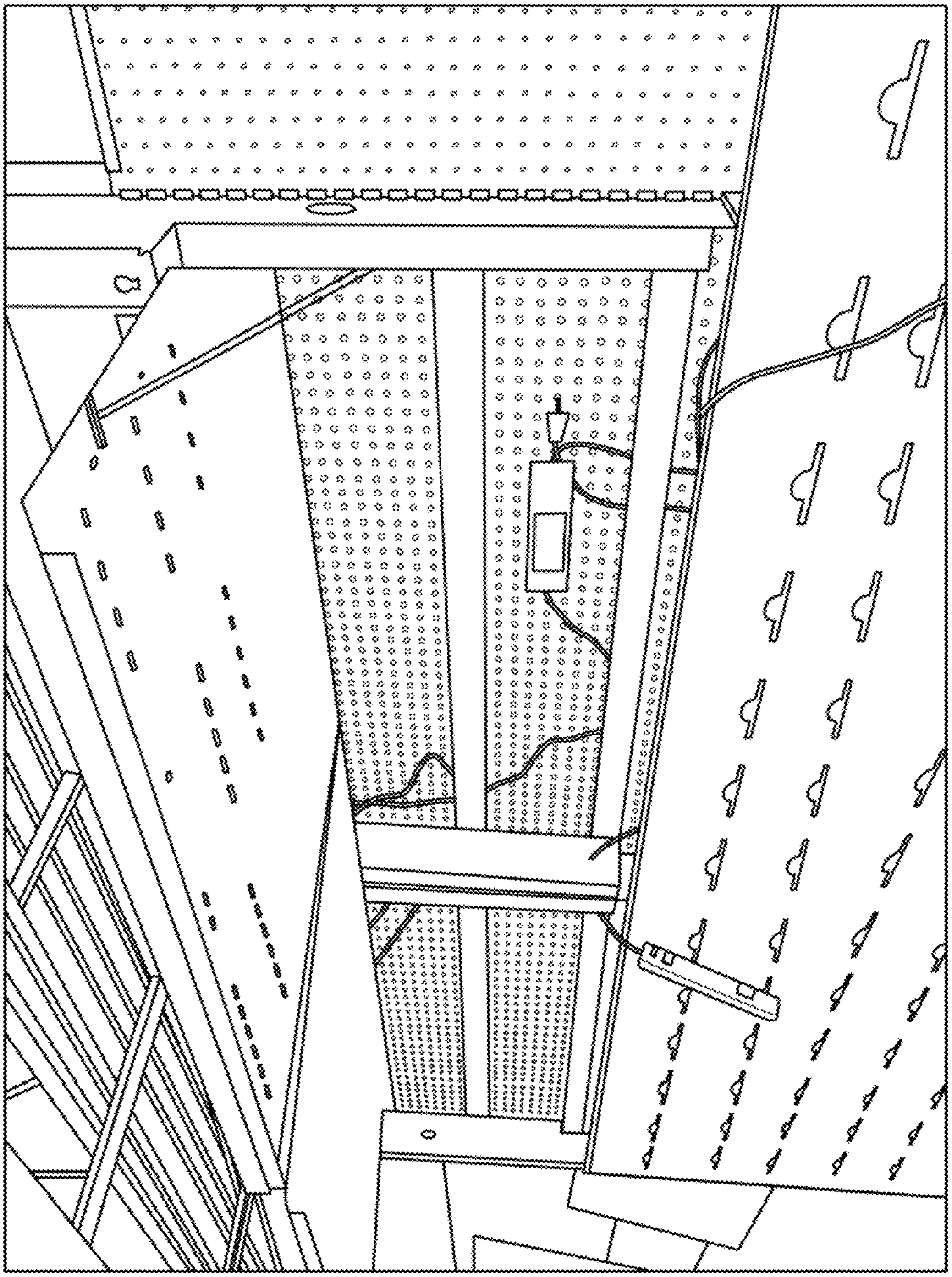
FIG. 25 is a perspective view of the frame mounted to a wall with the slats elevated and retained by the kickstand.
Figure 26:
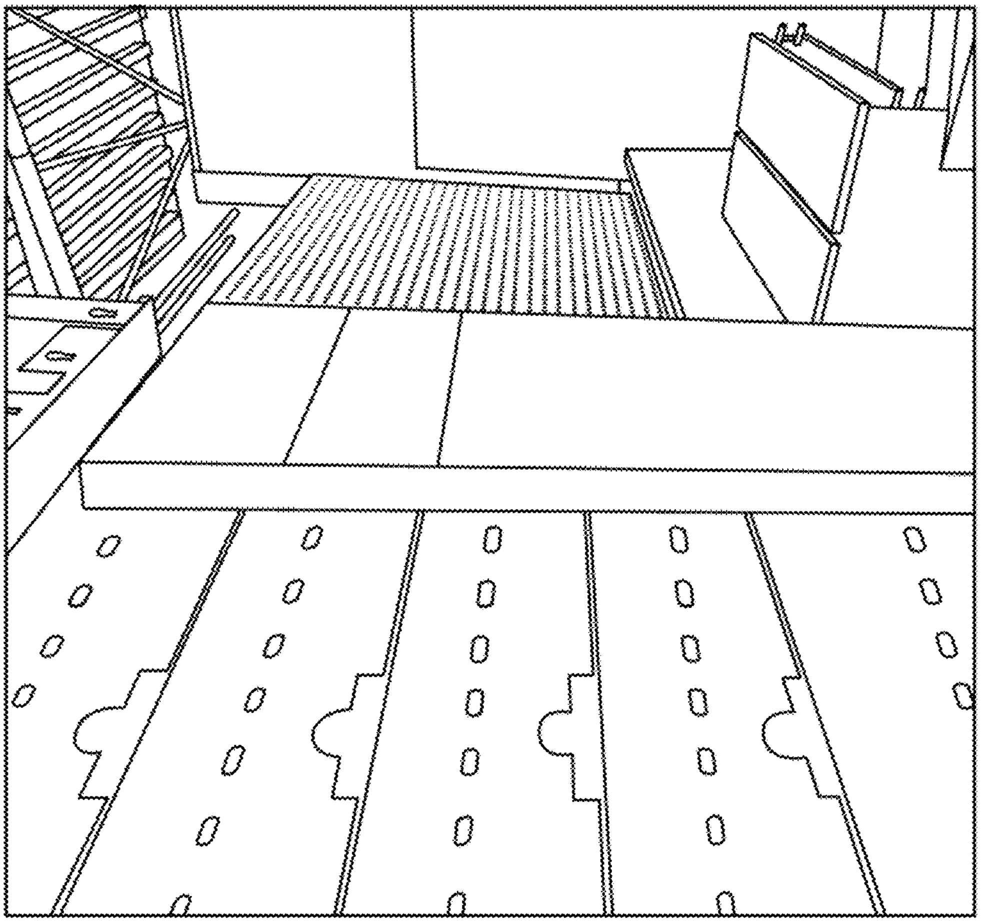
FIG. 26 is a perspective view of the frame showing features mounted to the slats.
Figure 27:
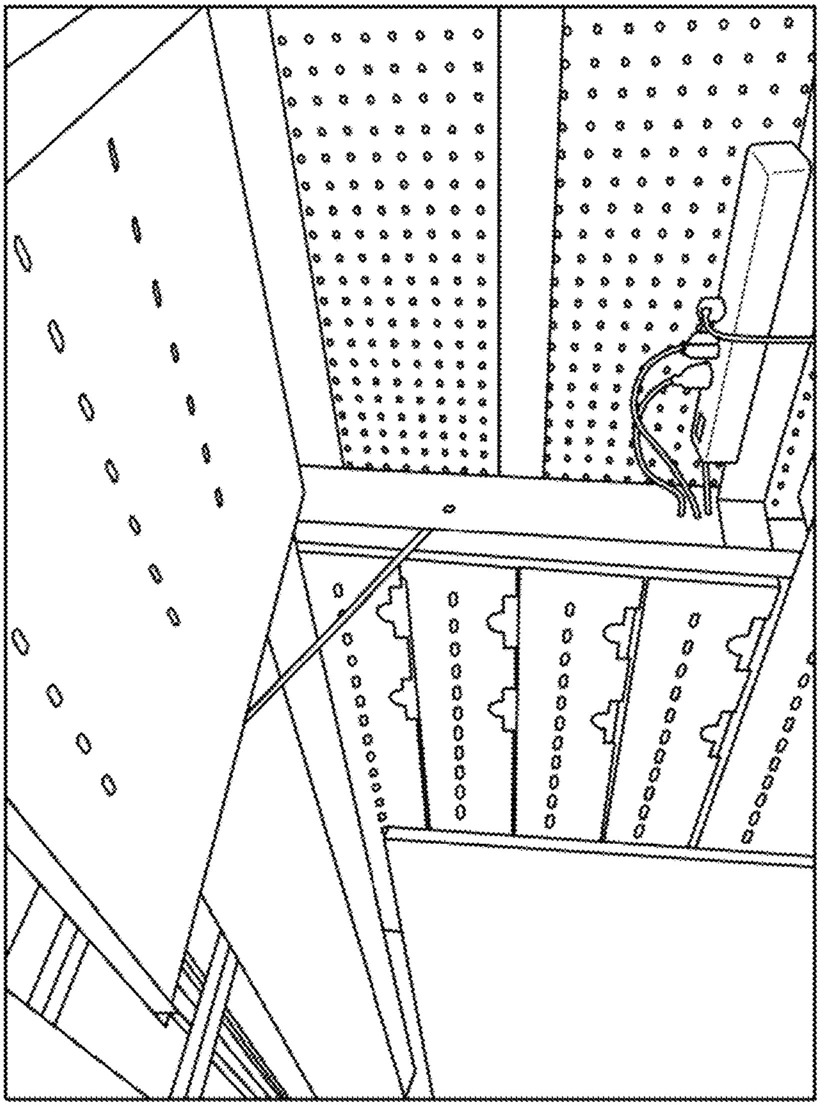
FIG. 27 is a perspective view of multiple frame panels secured to a wall with one slat elevated on the kickstand.

The invention claimed is:

1. A panel system, comprising:

a plurality of panel units, each panel unit including:

a frame defined by opposing vertical and horizontal supports, a plurality of slats having alternating rows of large and small holes penetrating therethrough, each slat hingedly secured to the frame such that the slats pivot relative to the frame, and at least two side panels having holes therein, each side panel secured to the slats and the frame, the side panels configured to be removably attached to side members with a wing nut;

a kick stand operatively connected to each slat, each kick stand configured to retain the slat in a hinged position; and the plurality of panel units secured to a wall fixture.

2. The panel system of claim 1 where the slats are secured to the frame by a pivoting connector.

3. The panel system of claim 1 where the slats pivot relative to the frame at a top position of the frame.

4. The panel system of claim 1 where the large holes are configured to receive brackets to which other items are affixed.

5. The panel system of claim 1 where the slats comprise grooves therebetween to which other items are configured to be affixed.

6. The panel system of claim 1 further comprising the side members secured to the frame.

7. The panel system of claim 6 where the side members further comprise hooks configured to secure the panel system to the wall fixture.

8. The panel system of claim 1 where the side members are secured to the frame, and the side panels are secured to the side members.

9. The panel system of claim 8 where the side members and the side panels have holes, where cords are configured to be routed through the holes in the side members, the side panels, and the slats.

10. The panel system of claim 1 where the frame further comprises horizontal and vertical braces.

11. The panel system of claim 10 where the side panels further comprise teeth for securing to the frame.

12. The panel system of claim 11 where the teeth are configured to secure the panel system to a gondola.

* * * * *